Dec. 19, 1961   J. R. OISHEI ET AL   3,013,625
MOTOR VEHICLE DOOR LOCKING SYSTEM
Filed July 9, 1958   2 Sheets-Sheet 2
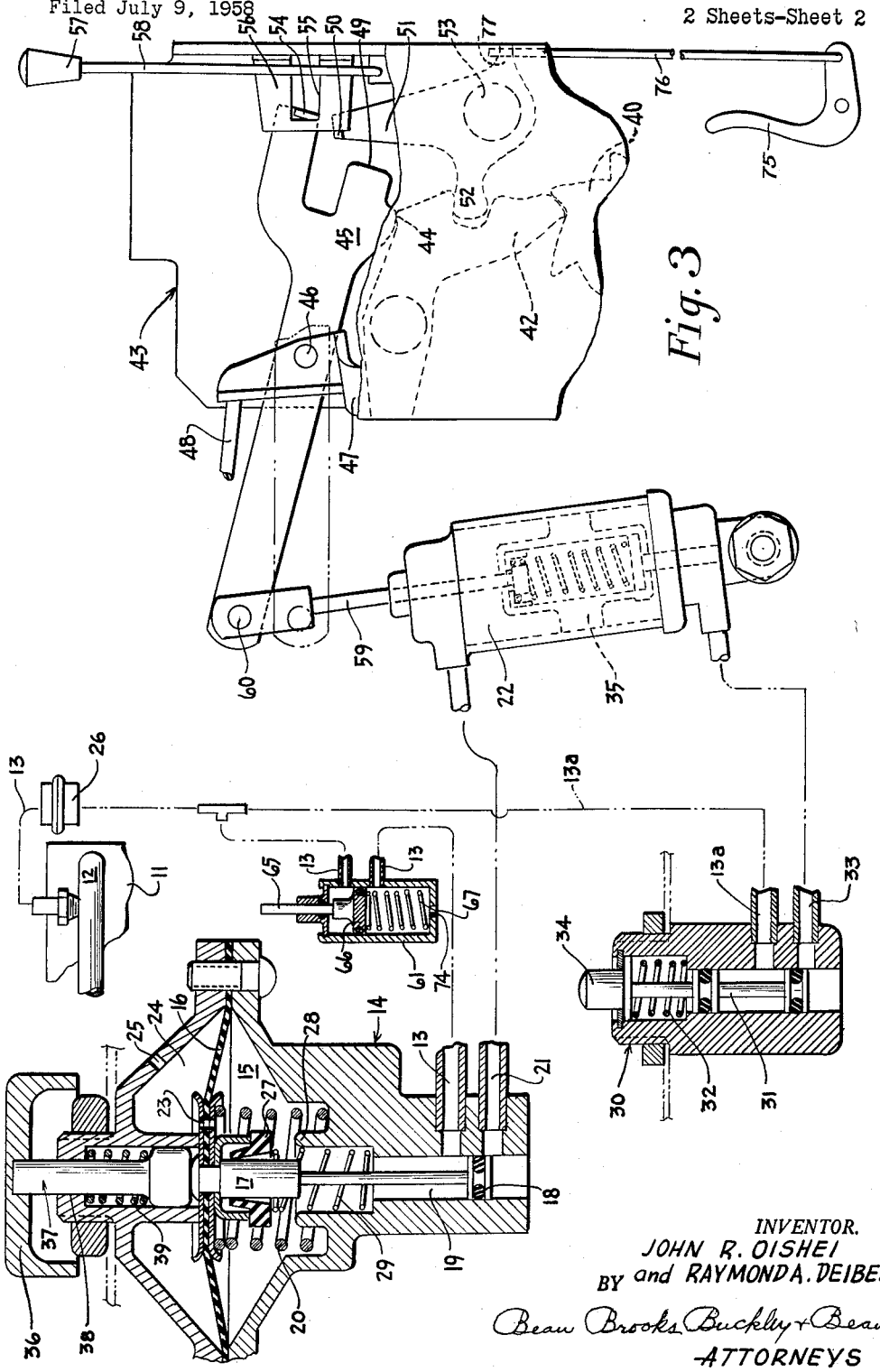
INVENTOR.
JOHN R. OISHEI
BY and RAYMOND A. DEIBEL
Bean Brooks Buckley & Bean.
ATTORNEYS

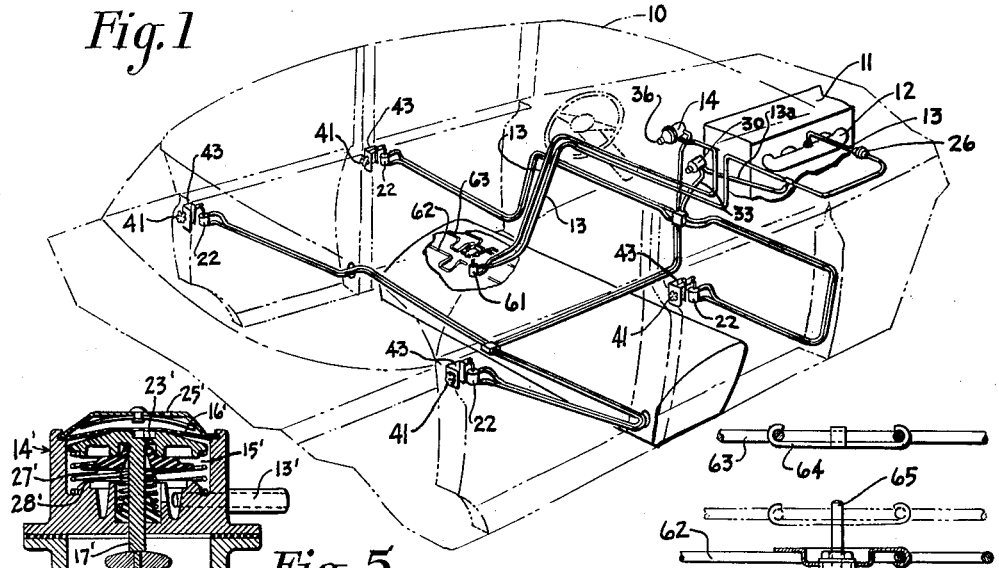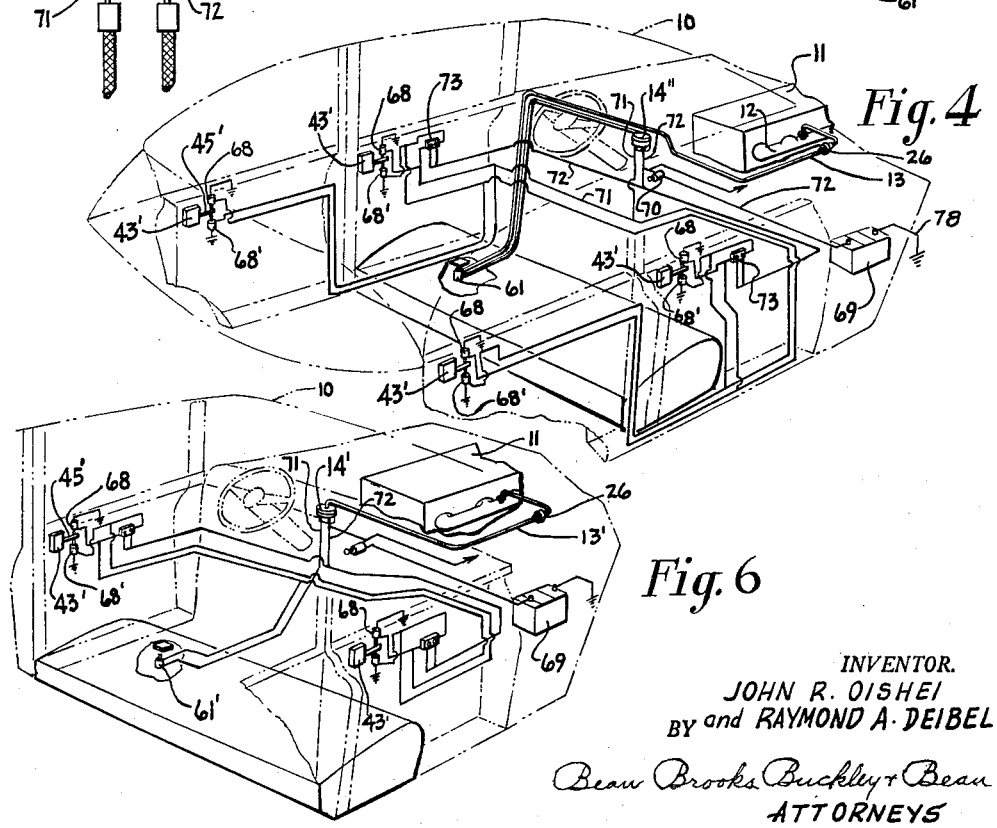

United States Patent Office 3,013,625
Patented Dec. 19, 1961

3,013,625
MOTOR VEHICLE DOOR LOCKING SYSTEM
John R. Oishei, Buffalo, and Raymond A. Deibel, Cheektowaga, N.Y., assignors to Trico Products Corporation, Buffalo, N.Y.
Filed July 9, 1958, Ser. No. 747,421
9 Claims. (Cl. 180—82)

This invention relates to automatic car door latch-locking to safeguard car operators from the highway hazards of unauthorized intrusion, this invention being an improvement on that disclosed in copending application Serial No. 685,462 wherein a power system utilizes the engine suction as a power source for automatically latch-locking the car doors to defeat wanton entry. The system of latch-locking the doors automatically is accomplished through a distributor which is responsive to the engine manifold suction and acts instantly upon the starting up of the engine, whereupon any of the doors of the motor vehicle not locked are simultaneously fully latch-locked against entry from outside the car.

The automatic action, which relieves the driver of the necessity of thinking and acts to overcome forgetfulness, can, under certain circumstances, result in inadvertent lock-out of the car body, as for example whenever the engine may be started by use of a jumper such as used by automobile mechanics during periods of tune-up or check-up of engine or ignition operation without entering the car and using the starter key.

The primary object of this development is to prevent any unwanted operation of the automobile latch-locking by use of a simple dependable disconnect that is low in cost and requires no deliberate action on the part of the car operator by being self-responsive for deactivating or interrupting the power supply line.

An object of the instant invention is to provide an interrupter control to function as a means of disconnecting the automatic locking at all times during the unoccupancy of the driver's seat. This desirable feature, when coupled with the automatic latch-locking system, completely removes all hazard of being locked out of the vehicle since in exiting through either one of the doors, either right or left, the door will not be automatically latch-locked under any circumstances unless the driver's seat is occupied, but on the contrary will require the deliberate latch-locking manually of the door through which the car operator exits after leaving the driver's seat.

The interrupter control is positioned in the seat portion of the seat so as to become operative under the body weight of the driver and provides a cut-off which serves to interrupt the source of power supply leading to the automatic latch-locking distributor, and from there in turn to various servo-units positioned in the individual car doors. The interrupter control may be in the form of a valve or an electric switch depending upon the character of the latch-locking system. In either instance, the interrupter control valve or switch serves as a power cut-off to idle the automatic latch-locking system.

According to the present invention, the seat-controlled interrupter valve or switch has for its primary aim and purpose to prevent the driver of the automobile from locking himself out after alighting from the vehicle, without disturbing the automatic latch-locking function of the system to protect the occupants of the vehicle against unlawful intrusion under normal vehicle occupancy and driving conditions.

The foregoing and other objects of the invention will appear as the description progresses, reference being made to the accompanying drawing, wherein FIG. 1 is a fragmentary perspective view of an automotive vehicle having an intrusion guard system incorporated therein and showing the interrupter seat valve of the present invention for cutting off the power to the system when the driver or operator has left the vehicle;

FIG. 2 is a detail view of the interrupter seat-controlled valve for use with the system of FIG. 1;

FIG. 3 is a diagrammatic lay-out of the system depicted in FIG. 1;

FIG. 4 is a modification of the intrusion guard system of FIG. 1 having a partly electrical, partly fluid pressure operated intrusion guard system;

FIG. 5 is a detail view of the interrupter seat-controlled switch serving as a combined automatic master control and power distributor; and FIG. 6 is a modification of the system shown in FIG. 4.

Referring more particularly to FIG. 1 of the accompanying drawings, a vehicle 10 is shown having an engine 11 with an intake manifold 12 connected by a conduit 13 to a master control and power distributor 14. The distributor may be of any suitable design but is herein patterned after the embodiment shown in the above entitled application and has a vacuum chamber 15 containing a diaphragm 16 with a centrally depending valve stem 17 supporting a valve 18 operating within a valve chamber 19 into which the conduit 13 opens. A spring 20 supports the diaphragm in its elevated position wherein the valve 18 is positioned to maintain normal connection between the power transmission line 13 and the motor chamber 15 while blocking communication with conduit 21 leading off to the upper ends of the several servo-motors 22. The diaphragm is provided with a bleed port 23 leading to the upper or atmospheric chamber 24 which is open to the outside atmosphere port 25. A check valve 26 is arranged in the suction line 13 to maintain the low pressure in the motor chamber against recycling action of the power distributor diaphragm 16 should the suction drop off substantially. The power distributor also carries on the depending valve stem 17 a second valving element 27 which comes down upon the valve seat 28 for closing off the suction line 13 to the motor chamber. This valve remains seated as long as the vehicle engine continues in operation and serves to prevent the recycling of the power distributor or master control diaphragm 16 during periods of high manifold suction. A light spring 29 serves to unseat the valve 27 after the engine stops to thereby set the door locking system in condition to function on the next start of the engine.

When it becomes necessary to open the door for a coming passenger, there is provided an unlocking control indicated generally at 30 which comprises a valving element 31 normally supported by a spring 32 to close off communication between the suction line branch 13a and a conduit 33 leading to the lower end of each servo-unit 22. Depressing the button 34 against the spring urge will establish communication between the intake manifold and the lower ends of the several servo-units to cause their pistons 35 to render the respective latch locks of the individual doors ineffective so that the door may be operated from the outside door handle.

To again relock the doors through their latch-locking mechanism, a manual relock control is provided in the form of a knob 36 that is carried by its stem 37 that is slidably mounted in a bearing 38 in the upper end of the casing for the power distributor motor. A spring 39 normally holds the lower end of the stem seated upon the power diaphragm 16. Consequently, when the relock control 36 is depressed under manual pressure it will move the central portion of the diaphragm downwardly and shift the valve 18 to reestablish communication between the conduits 13 and 21.

The latch-locking mechanism, generally indicated by the numeral 43, may be of any conventional form but is herein illustrated as having a ratchet wheel 40 fixed to a shaft (not shown) which latter carries at its outer end a rotary latch 41 for cooperatively engaging the usual striker plate to hold the door closed. The ratchet wheel 40 is held against rotation by a spring pressed arresting pawl 42 suitably pivoted and having a shoulder 44 for lifting engagement with the lock bar 45. This lock bar is pivoted at 46 to a lever 47 that is adapted to be rocked by the customary exteriorly located door handle acting through a pin 48. The lock bar 45 normally rests upon shoulder 44 when the latch-locking mechanism is operative, as shown in full lines in FIG. 3. In this position an abutment or shoulder 49 has its path of movement displaced from the lug 50 on a bellcrank lever 51 which has an arm 52 pivotally connected to the arresting pawl 42. When the lock bar is in its dotted position abutment 49 is positioned to engage the lug 50 and lift the arrest pawl out of engagement with the ratchet wheel 40. The bellcrank is suitably pivoted at 53. The inner end of the lock bar is formed with a lug 54 which has guiding support in a slot or guideway 55 formed in a positioning lever 56 to which the usual window sill button 57 is connected by a rod 58. By depressing the button 57 the lock bar is displaced to prevent engagement of its abutment 49 with the lug 50. Likewise this displacement may be effected by having the respective servo-unit piston 35 connected through a rod 59 and a pin 60 to the outer end of the lock bar, and connecting the suction line 13 to the upper side of the piston, as by the relocking control 36.

All of the foregoing is more fully set forth in the above referred to copending application Serial No. 685,462.

The primary purpose of the present invention is for preventing a lock-out of the driver from the automatic system when the driver's seat in the car is not occupied. To this end there is provided in the automatic latch-locking system an interlocking interrupter seat-controlled valve which serves to maintain the system operative while the motorist is occupying his seat but otherwise is designed to disrupt the automatic system and render it inoperative when the seat is unoccupied.

According to the embodiment of the invention shown in FIGS. 1 and 3, an interrupter valve 61 is interposed in the power line 13 to interrupt the power transmission to the several servo-units. This interrupter valve is associated with the vehicle seat so as to interrupt the pressure communication under the weight of the motorist. As shown in FIGS. 1 and 2, the seat is provided with a lower spring or base member 62, which may constitute one of the seat cushion springs, and an overlying spring 63, the latter responding to the driver's weight and depressing its carried striker plate 64 upon a valve stem 65 to open the seat valve, as is more clearly shown in FIG. 3. The valving element or head 66 is carried by the stem 65 and is normally supported by a spring 67 to interrupt communication between the manifold and the power distributor. When the seat is occupied the valving member 66 is depressed to open the pressure line, but otherwise the pressure communication will be interrupted and the door locking system prevented from becoming operative.

While the embodiment just described is operable under negative pressure, it will become apparent that a positive pressure system may be utilized in accordance with the fuller disclosure made in said copending application.

Further, the intrusion guard system may operate electrically by the use of electromagnetic type servo-units, as indicated at 68 and 68' in FIGS. 4 and 6, the armatures of the electric servo-units being connected to the lock bar 45' of the respective latch-locking mechanisms 43'. The circuit wiring comprises a battery 69 and the usual key-operated ignition switch 70. The master control or power distribtuor may be modified to the extent shown in FIG. 5 wherein a power diaphragm 16' has a depending stem 17' which carries a contact 18' that is designed to close the circuit through the wires 71 and 72. The power distributor has a pressure chamber 15' that has suction communication through a conduit 13' so that the pressure surge in the intake manifold resulting from the starting of the engine will depress the diaphragm 16' to close the electric circuits through the contact 18' and will concurrently bring the cycle prevention valve 27' down upon its seat 28'. Vents 23' and 25' will serve to dissipate the influence of the vacuum on the diaphragm in the same manner as in the earlier described power distributor and master control unit.

In the embodiment shown in FIG. 6, the power distributor 14' of FIG. 5 is connected in circuit with a seat-controlled interrupter switch 61' whereas in the embodiment shown in FIG. 4 the power distributor 14" may be pressure operated in a manner that is similar to the embodiment shown in FIG. 3 and connected in fluid circuit with a seat-controlled interrupter valve 61.

The battery is grounded by a wire 73 and its circuit wire 72 leads through the ignition switch 70 to the distributor 14' and also to the several latch-locking servo-units 68, and thence to the ground. The distributor wire 71 is connected to the several latch-unlocking servo-units 68'. In both FIGS. 4 and 6, individual control switches 73 may be provided for the two front doors and they are arranged so that the operation of either will correspondingly affect the remaining door latch-locking units.

From the foregoing it will be appreciated that an automatic intrusion guard system has been developed as a safe guard for car operators from the highway hazards of unauthorized intrusion; a system which will preclude the possibility of the motorist locking himself out of the vehicle. The interrupter seat valve 61 may be provided with an opening 74 which, when the seat is unoccupied and the spring 67 moves the valving head 66 upwardly to uncover the conduit passage to the valve chamber 19, will vent the vacuum chamber 15 of the power distributor 14 and cause the spring 29 to unseat the valve 27 for exposing the motive diaphragm to the suction line for the next start of the engine. In other words, the interrupter valve has the same effect on the latch-locking system as when the engine stops.

In operation, assuming that the vehicle is standing and the engine is running with all vehicle doors latch-locked and the driver of the vehicle desires to leave through his door, the driver will then operate the inner door handle 75 to act through a connecting linkage 76 upon an arm 77 fixed on the bellcrank 51 for lifting the arresting pawl 42 to free the ratchet wheel 40. As he leaves the seat, the valve 61 will open to vent the distributor chamber 15 to the atmosphere and unseat the cycle preventing valve 27. The remaining locking mechanisms of the other doors, now being disconnected from the source of suction, will remain operative so that when the driver again enters his seat and opens the valve 61 under his weight, the entire system will be reenergized with the negative pressure. In the meantime, if any of the other locking mechanisms have been manually disturbed, they will at this time be reenergized by the suction to latch-lock their doors.

While the description has been given in detail, it is without thought of limitation since the inventive principles involved are capable of assuming other embodiments and arrangements without departing from the spirit of the invention and the scope of the appended claims.

What is claimed is:

1. A door locking system for a motor vehicle having a plurality of doors therein, comprising door lock means for each of certain of said doors, means for automatically locking said door lock means in response to the operation of a power part of the vehicle, interruptor means automatically responsive to a necessary action of a vehicle operator in leaving the vehicle to prevent automatic locking of the vehicle door opened by the vehicle operator when leaving the vehicle, said interruptor means being incapable of causing the unlocking of those doors which were not opened and comprising a seat switch mechanism adapted to permit locking action of said door lock means only when said operator is in the driver's position in the vehicle.

2. An automatic door locking system for a vehicle having a plurality of doors therein, comprising a latch-lock for each of certain of said doors, motor means for actuating said latch-locks to a locked or an unlocked position, means responsive to the operation of a power part of the vehicle for automatically actuating said motor means to place said latch-locks in a locked position, said latch-locks including means for maintaining them in the condition in which they were last positioned until they are acted on by an external force, and an interrupter means responsive to a necessary movement of a vehicle operator in leaving the vehicle for preventing said motor means from automatically relocking the vehicle door opened by the vehicle operator in leaving the vehicle, whereby accidental locking out of the vehicle operator due to the action of the automatic door locking system is avoided while the vehicle doors not opened are retained in a locked condition.

3. An automatic door locking system for a vehicle having a plurality of doors therein comprising a lock for each of certain of said doors, motor means for actuating said locks to a locked position, means responsive to the operation of a predetermined part of the vehicle for automatically actuating said motor means to place said locks in a locked position, said locks including means for maintaining them in the condition in which they were last positioned regardless of any subsequent condition of said predetermined part of the vehicle until they are again acted on by an external force, and interrupter means responsive to a necessary movement of the vehicle operator in leaving a vehicle for preventing said motor means from automatically locking the vehicle door opened by the vehicle operator in leaving the vehicle notwithstanding that said predetermined part of said vehicle is in a condition which would cause automatic locking of all of said vehicle doors, whereby accidental locking out of the vehicle operator due to the action of the automatic door locking system relative to said door which was opened by the operator in leaving the vehicle is avoided while the vehicle doors not opened are retained in a locked condition due to the action of said means for maintaining the locks in the condition in which they were last positioned.

4. A door locking system for a motor vehicle comprising a plurality of doors in said vehicle, locking means for each of certain of said doors, means for causing automatic locking of said locking means, and switch means positioned within the vehicle and conveniently accessible to a person standing outside of the vehicle, said switch means being capable of operation after one of the vehicle doors has been opened for permitting a vehicle operator to unlock certain of the other of said vehicle doors from a remote position before entering the vehicle.

5. A door locking system as set forth in claim 4 wherein said switch means is positioned on the inside of the vehicle door.

6. A door locking system for a motor vehicle comprising a plurality of doors in said vehicle, locking means for each of certain of said doors, and means capable of being operated after one of said vehicle doors has been opened for permitting a person to unlock doors on the opposite side of the vehicle before entering the vehicle.

7. An automatic door locking system for a vehicle having a plurality of doors therein comprising a latch lock for each of certain of said doors, motor means operatively coupled to each of said latch locks, a source of energy in said vehicle available for powering said motor means in response to the normal operation of the vehicle, energy transferring means extending between said source of energy and said motor means, interrupter switch means associated with said energy transferring means for selectively permitting energy to be transferred from said energy source to said motor means or for preventing said transfer of energy, means for mounting said interrupter switch means in a position in said vehicle so that said switch means will permit communication between said energy source and said motor means in response to a predetermined condition but prevent the transfer of energy from said energy source to said motor means when said predetermined condition does not exist to thereby cause said motor means to place said latch locks in a locked condition when said predetermined condition exists but prevent said motor means from placing said latch locks in a locked condition when said predetermined condition does not exist, means associated with each of said latch locks for retaining said latch locks in the condition in which they were last placed until said latch locks are subsequently acted on by an external force whereby said latch locks which are in a locked condition as a result of the automatic operation of the door locking system remain in a locked condition regardless of whether the energy source is available and regardless of whether said predetermined condition exists or does not exist thereby requiring relocking of only those latch locks in the doors which were actually opened by passengers leaving the vehicle.

8. An automatic door locking system for a vehicle having a plurality of doors therein comprising a latch lock for each of certain of said doors, motor means operatively coupled to each of said latch locks, a source of energy in said vehicle available for powering said motor means in response to the normal operation of the vehicle, energy transferring means extending between said source of energy and said motor means, a switch associated with said energy transferring means for selectively permitting energy to be transferred from said energy source to said motor means or for preventing said transfer of energy, means for mounting said switch underneath the seat of the vehicle operator so that said switch means will permit communication between said energy source and said motor means when said vehicle seat is occupied but prevent the transfer of energy from said energy source to said motor means when said vehicle seat is unoccupied to thereby cause said motor means to place said latch locks in a locked condition when said vehicle seat is occupied and when said energy source is available for powering said motor means, said switch preventing said motor means from placing said latch locks in a locked condition when said vehicle seat is unoccupied even if said energy source is available for powering said motor means, means associated with each of said latch locks for retaining said latch locks in the condition they were last placed until said latch locks are subsequently acted on by an external force whereby said latch locks which are in a locked condition as a result of the automatic operation of said door locking system remain in a locked condition after having been placed in such a condition regardless of whether the energy source is available and regardless of whether said seat is occupied or unoccupied thereby requiring relocking of only those latch locks in the doors which were actually opened by passengers leaving the vehicle.

9. An automatic door locking system for a vehicle having a plurality of doors therein comprising a latch lock for each of certain of said doors, a fluid pressure motor operatively coupled to each of said latch locks, a source of fluid pressure in said vehicle available for powering said fluid pressure motors in response to the normal operation of the vehicle, conduit means extending between said source of fluid pressure and said fluid pressure motors, valve means positioned in said conduit means for selectively permitting fluid pressure of said source to communicate with said fluid pressure motors or for preventing such communication, means mounting said valve means under the seat of the vehicle operator so that said valve means will permit communication between said source of fluid pressure and said fluid pressure motors when said vehicle seat is occupied but prevent such communication when said vehicle seat is unoccupied to thereby cause said fluid pressure motors to place said latch locks in a locked condition when said vehicle seat is occupied and when said source of fluid pressure is available but prevent said fluid pressure motors from placing said latch locks in a locked condition when said vehicle seat is unoccupied, means associated with each of said latch locks for retaining said latch locks in the condition in which they were last placed until said latch locks are subsequently acted on by an external force whereby said latch locks which are in a locked condition as a result of the automatic operation of the door locking system remain in such a locked condition regardless of the condition of said fluid pressure source and regardless of whether said seat is occupied or unoccupied thereby requiring relocking of only those doors which were actually opened by passengers leaving the vehicle.

References Cited in the file of this patent

UNITED STATES PATENTS

| | | |
|---|---|---|
| 1,675,465 | Roehrich | July 3, 1928 |
| 2,167,260 | Laddaga | July 25, 1939 |
| 2,198,862 | Chesler | Apr. 30, 1940 |
| 2,344,826 | Le Gresley | Mar. 21, 1944 |
| 2,515,044 | Kappel | July 11, 1950 |